United States Patent
Yang

(10) Patent No.: US 9,302,728 B1
(45) Date of Patent: Apr. 5, 2016

(54) SCOOTER STRUCTURE

(71) Applicant: VAST MIND DESIGN CREATIVE LTD., Taipei (TW)

(72) Inventor: Kuan-Li Yang, Taipei (TW)

(73) Assignee: VAST MIND DESIGN CREATIVE LTD., Taipei (TW)

( * ) Notice: Subject to any disclaimer, the term of this patent is extended or adjusted under 35 U.S.C. 154(b) by 0 days.

(21) Appl. No.: 14/749,047

(22) Filed: Jun. 24, 2015

(30) Foreign Application Priority Data

Nov. 12, 2014 (TW) .............................. 103139306 A

(51) Int. Cl.
*B62K 3/02* (2006.01)
*B62K 15/00* (2006.01)
*B62K 3/00* (2006.01)
*B62K 19/46* (2006.01)

(52) U.S. Cl.
CPC ............... *B62K 15/006* (2013.01); *B62K 3/002* (2013.01); *B62K 19/46* (2013.01); *B62K 2015/001* (2013.01); *B62K 2015/005* (2013.01)

(58) Field of Classification Search
CPC . B62K 3/002; B62K 15/006; B62K 2015/005
See application file for complete search history.

(56) References Cited

U.S. PATENT DOCUMENTS

| | | | | |
|---|---|---|---|---|
| 1,593,280 A * | 7/1926 | Witwer | .................... | B62K 3/002 116/60 |
| 1,658,068 A * | 2/1928 | White | .................... | B62K 3/002 280/14.25 |
| 6,332,565 B1 * | 12/2001 | Tsai | .................... | B62J 99/00 224/257 |
| 6,332,621 B1 * | 12/2001 | Wu | .................... | B62K 3/002 16/900 |
| 7,431,311 B2 * | 10/2008 | Turner | .................... | A45F 3/04 190/18 A |
| 8,201,837 B2 * | 6/2012 | Dweek | .................... | A45C 5/146 224/153 |
| 2001/0035621 A1 * | 11/2001 | Herman | .................... | B62K 15/006 280/87.041 |
| 2002/0096849 A1 * | 7/2002 | Bang | .................... | A63C 17/26 280/87.041 |
| 2002/0096850 A1 * | 7/2002 | Lu | .................... | B62J 15/00 280/87.042 |
| 2002/0105157 A1 * | 8/2002 | Chen | .................... | B62K 3/002 280/87.041 |
| 2002/0113404 A1 * | 8/2002 | Yang | .................... | B62K 9/00 280/293 |
| 2003/0071429 A1 * | 4/2003 | Bradshaw | .................... | A63C 17/01 280/87.041 |
| 2003/0227154 A1 * | 12/2003 | Yo | .................... | B62M 1/16 280/244 |
| 2004/0032105 A1 * | 2/2004 | Tsai | .................... | B62K 3/002 280/87.041 |
| 2004/0195794 A1 * | 10/2004 | Fan | .................... | B62H 1/12 280/87.041 |

(Continued)

*Primary Examiner* — Jeffrey J Restifo
*Assistant Examiner* — Erez Gurari
(74) *Attorney, Agent, or Firm* — Rabin & Berdo, P.C.

(57) ABSTRACT

A scooter structure includes a vertical frame and a pedal body. The bottom of the vertical frame connects to (a) front wheel (s). The rear end of the pedal body connects to (a) rear wheel (s), the front end of the pedal body connects to an auxiliary supporter. The auxiliary supporter includes a pivoting portion pivoted at the bottom of the vertical frame and an extension element located higher than that of the pivoting portion. The extension element connects to auxiliary wheels by an assembling component. The pedal body uses the pivoting portion as the rotation shaft, and is selectively rotated between an expansion position (the pedal body is away from the vertical frame and the rear wheel is on the ground) and a folded position (the pedal body is close to the vertical frame and the auxiliary wheels are on the ground) with respect to the vertical frame.

17 Claims, 14 Drawing Sheets

(56) References Cited

U.S. PATENT DOCUMENTS

| | | | |
|---|---|---|---|
| 2008/0315544 A1* | 12/2008 | Jackman | B62K 3/002 280/87.05 |
| 2010/0096824 A1* | 4/2010 | Hadley | B62K 3/002 280/87.041 |
| 2012/0187647 A1* | 7/2012 | Vo | B62K 13/00 280/87.041 |
| 2013/0062377 A1* | 3/2013 | Turner | B62K 3/002 224/276 |
| 2013/0257013 A1* | 10/2013 | Liao | B62K 19/18 280/279 |
| 2014/0008882 A1* | 1/2014 | Liao | B62K 3/002 280/40 |
| 2014/0151982 A1* | 6/2014 | Ferret | B62K 15/006 280/641 |
| 2015/0210340 A1* | 7/2015 | Wang | B62K 15/006 280/278 |
| 2015/0321722 A1* | 11/2015 | Dadoosh | B62K 3/002 180/208 |

* cited by examiner

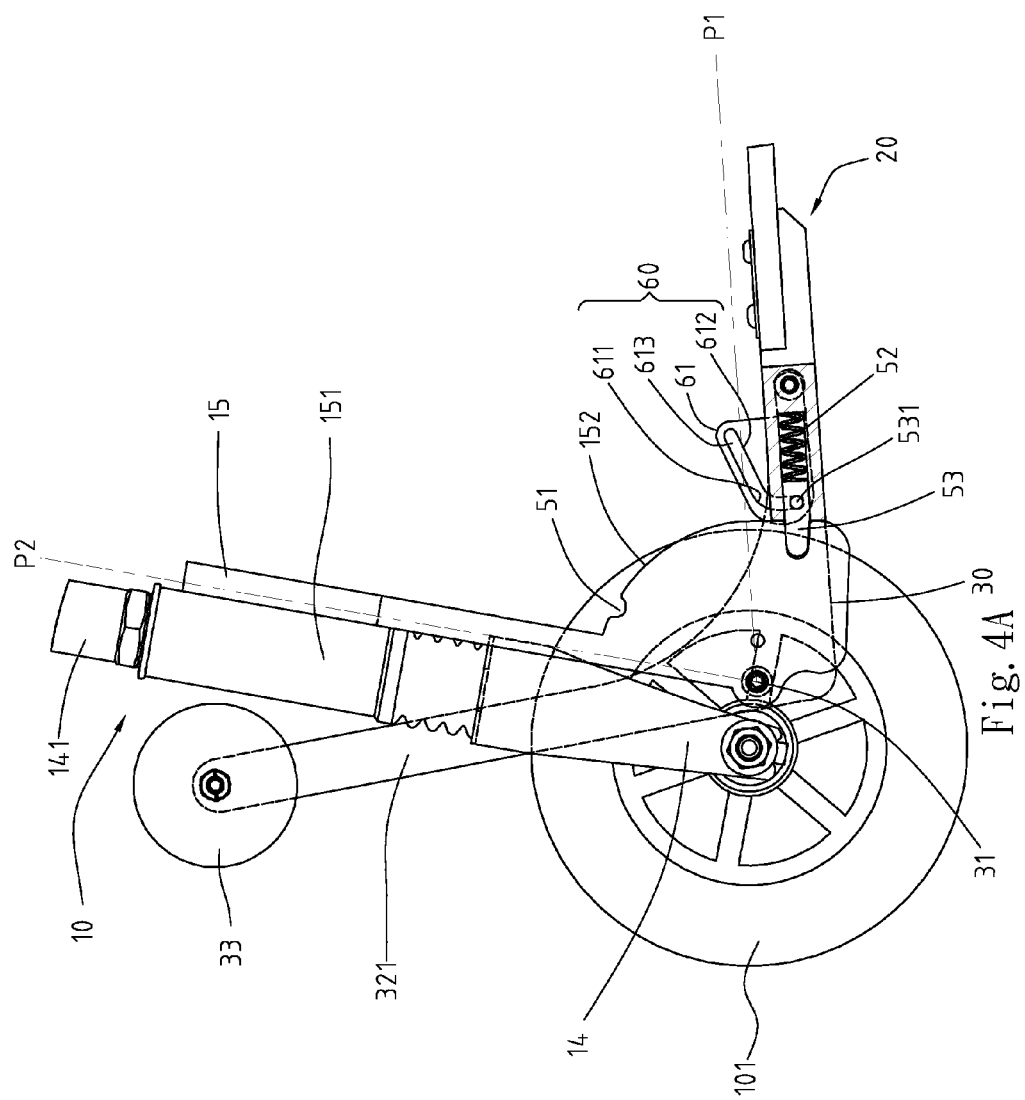

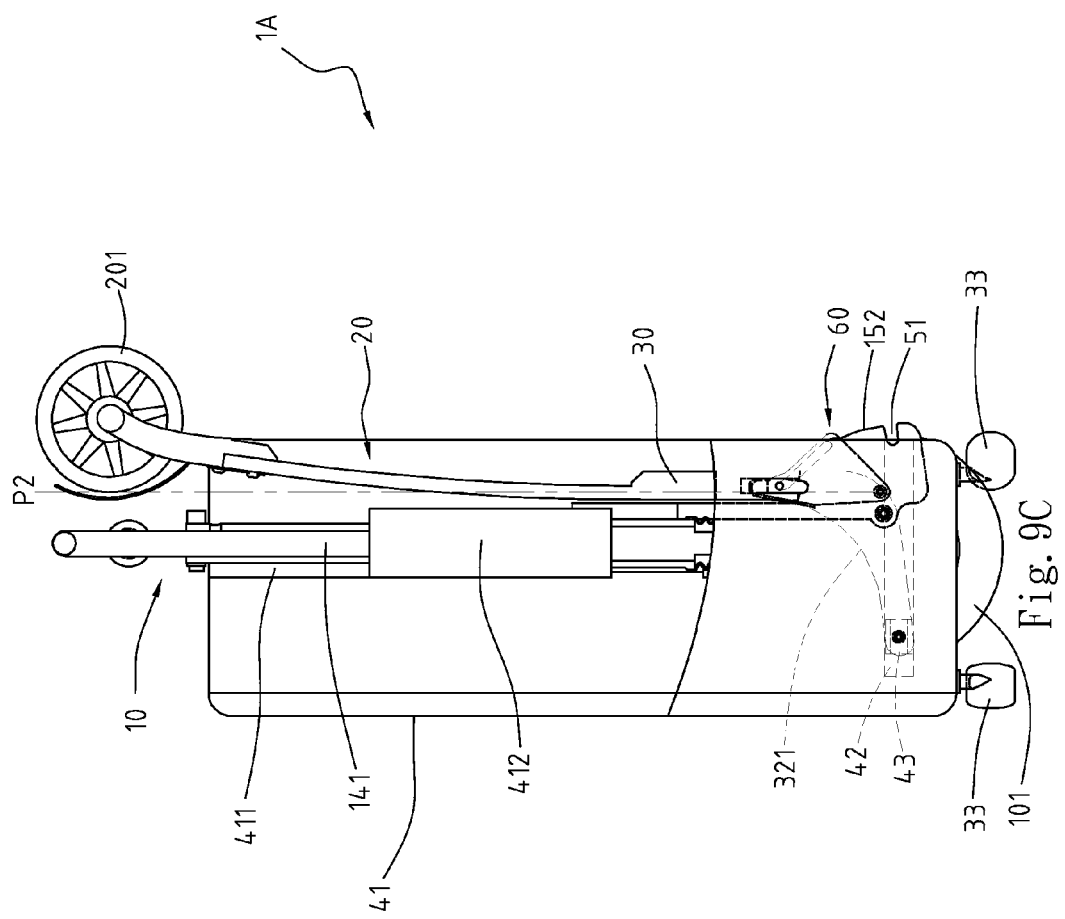

SCOOTER STRUCTURE

CROSS-REFERENCES TO RELATED APPLICATIONS

This non-provisional application claims priority under 35 U.S.C. §119(a) on Patent Application No. 103139306 filed in Taiwan, R.O.C. on Nov. 12, 2014, the entire contents of which are hereby incorporated by reference.

BACKGROUND

1. Technical Field

The instant disclosure relates to a kick scooter, particularly to a scooter structure that can be standable and dragable after folding.

2. Related Art

The scooter (also called kick scooter), is very light, highly flexible, and easy to operate. Consequently, it is very popular and its use has become a trend. In general, the main structure of the scooter comprises a horizontal pedal, a front wheel connected to the front of the pedal, and a back wheel connected to the back of the pedal; a vertical tube is connected to the front wheel and handles. However, the size of the scooter is very large, which may result in the folded scooter requiring a large storing space. Additionally, it is inconvenient to carry the large scooter when going out.

Accordingly, a foldable scooter has been developed, which can position the pedal close to the vertical tube after folding. However, the foldable scooter has several problems when in use. When the pedal is close to the vertical tube after folding, the back wheel is away from the ground. Consequently, the scooter is not able to stand without holding, because only the front wheel is standing on the ground. Furthermore, when the scooter is folded for storing, it must be lying on the ground. A large storing space is still required. Additionally, when carrying the scooter (for example, when in a station or an indoor area unsuitable for scootering), the user must carry the scooter by hand or use a bag. Consequently, the user may bear a heavy load when carrying the scooter, and it is necessary to improve the foldable scooter.

SUMMARY

In view of these problems, the present invention provides a scooter structure comprising a vertical frame and a pedal body. The vertical frame comprises a top end and a bottom end, wherein the top end is higher than the bottom end, and the bottom end is disposed with a front wheel. The pedal body comprises a front end and a rear end. The rear end is disposed with a rear wheel. The front end is connected to an auxiliary supporter. The auxiliary supporter comprises a pivoting portion pivoted to the bottom end of the vertical frame and an extension element higher than the pivoting portion. The extension element is assembled with at least one auxiliary wheel by using an assembling component. The pedal body uses the pivoting portion as the rotary shaft, and is selectively rotated between a expansion position and a folded position with respect to the vertical frame; the expansion position refers to the position that the pedal body is away from the vertical frame and the rear wheel is on the ground, and the folded position refers to the position in which the pedal body is close to the vertical frame and at least one auxiliary wheel is on the ground.

According to the above structure, the pedal body of the present invention may use the pivoting portion as the rotary shaft (or axis), and rotate toward to the vertical frame for the standing position (folded position), and the auxiliary wheels assembled to the auxiliary supporter may be on the ground. The auxiliary wheels and the front wheel may be on the ground at the same time, to support the scooter structure. Alternatively, the front wheel may be not on the ground, with only the auxiliary wheels on the ground for support. After folding, the pedal body and the vertical frame are in the standing position and supported by the wheels, thus reducing the storage space required. In addition, the auxiliary wheel may be a long cylinder roller with a single axis, and the contact area with the ground may be large enough to support the scooter structure with the front wheel in the standing position. Alternatively, the extension element may be disposed with more than two auxiliary wheels, so the auxiliary wheels and the front wheel may have multi contact points on the ground (for example, two auxiliary wheels and one front wheel form a triangle), to support the standing scooter structure.

In addition, after folding the pedal body and the vertical frame, the scooter structure may be moved by the auxiliary wheels and the front wheel, or by only the auxiliary wheels. Accordingly, the user may drag the scooter structure easily by standing the pedal body and the vertical frame, which may avoid the scooter structure affecting other people who are walking, or collision with other objects. Additionally, the scooter structure does not need the user to carry it by hand or by using a bag, which may reduce the user's load when carrying the scooter.

The top end of the vertical frame comprises a turning handle. The bottom end of the vertical frame comprises a front fork bracket. The front wheel is pivoted to the front fork bracket. The pivoting portion of the auxiliary supporter is pivoted on the connecting rack. Accordingly, the front wheel may change direction freely by using the turning handle. For example, when the turning handle turns 20 degrees, the front wheel turns 20 degrees at the same time. Consequently, the scooter structure is better able to change direction than other unchanging direction devices (such as the skateboard), and thus may provide a greater convenience and easier operation.

In one embodiment, the scooter structure further comprises a fixing body for fixing the pedal body in an expansion position or in a folded position. When the scooter structure is in use or folded for storage, the pedal body will not move or sway by using the fixing body, increasing the safety of the scooter.

In one embodiment, the scooter structure may comprise a release body for releasing the fixing body from the fixing status. That is, the user may control the release body to release pedal body from the fixing body, and the pedal body may use the pivoting portion as the shaft (or axis), to rotate freely.

In one embodiment, the fixing body comprises a slot, an elastic member, and a locking member connected to the elastic member, wherein the slot is disposed on the vertical frame, and the elastic member and the locking member are disposed on the auxiliary supporter. The locking member may be selectively locking onto, or releasing from, the slot. The release body comprises a releasing member, and a following member connected to the locking member. The releasing member is pivoted to the auxiliary supporter or the vertical frame rotatably, and the releasing member comprises a driving surface abutting against on the following member. Consequently, the user may step or press the releasing member to rotate. The releasing member uses the driving surface to press the following member, and the locking member is moved so as to allow the locking member to move away from the slot and release the fixing body.

In one embodiment, the scooter structure may comprise a brake (such as drum brake, disc brake, or caliper brake) disposed on the front wheel or the rear wheel, or disposed on both of the front wheel and the rear wheel, for stopping or slowing down, which may increase the safety of the scooter structure.

In one embodiment, the scooter structure may comprise a driving motor for driving at least one of the front wheel or the rear wheel to move the scooter structure. The user may also kick the ground (manually), to move the scooter structure forward.

In one embodiment, the assembling component may be a pivot shaft disposed through the auxiliary wheel for pivoting the auxiliary wheel on the extension element. Alternatively, in another embodiment, the assembling component may comprise a receiving box (luggage carrier or shopping box), a sliding groove, and a sliding brick. The sliding groove is disposed on the receiving box, the sliding brick is slid and moved within the at least one sliding groove, the sliding brick is pivoted to the extension element, and the bottom of the receiving box is assembled with the at least one auxiliary wheel. That is, the assembling component may be the luggage carrier disposed with the sliding groove, and the bottom of the luggage carrier is disposed with auxiliary wheels. When the pedal body is in the folded position, the auxiliary wheels on the bottom of the luggage carrier are on the ground for the scooter structure to be standing and be dragged.

BRIEF DESCRIPTION OF THE DRAWINGS

FIG. 4A a side view showing the folding movement (1) of the scooter according to the first embodiment of the instant disclosure.

FIG. 9C is a side view showing the folding movement (3) of the scooter according to the second embodiment of the instant disclosure.

DETAILED DESCRIPTION

Figure 1:
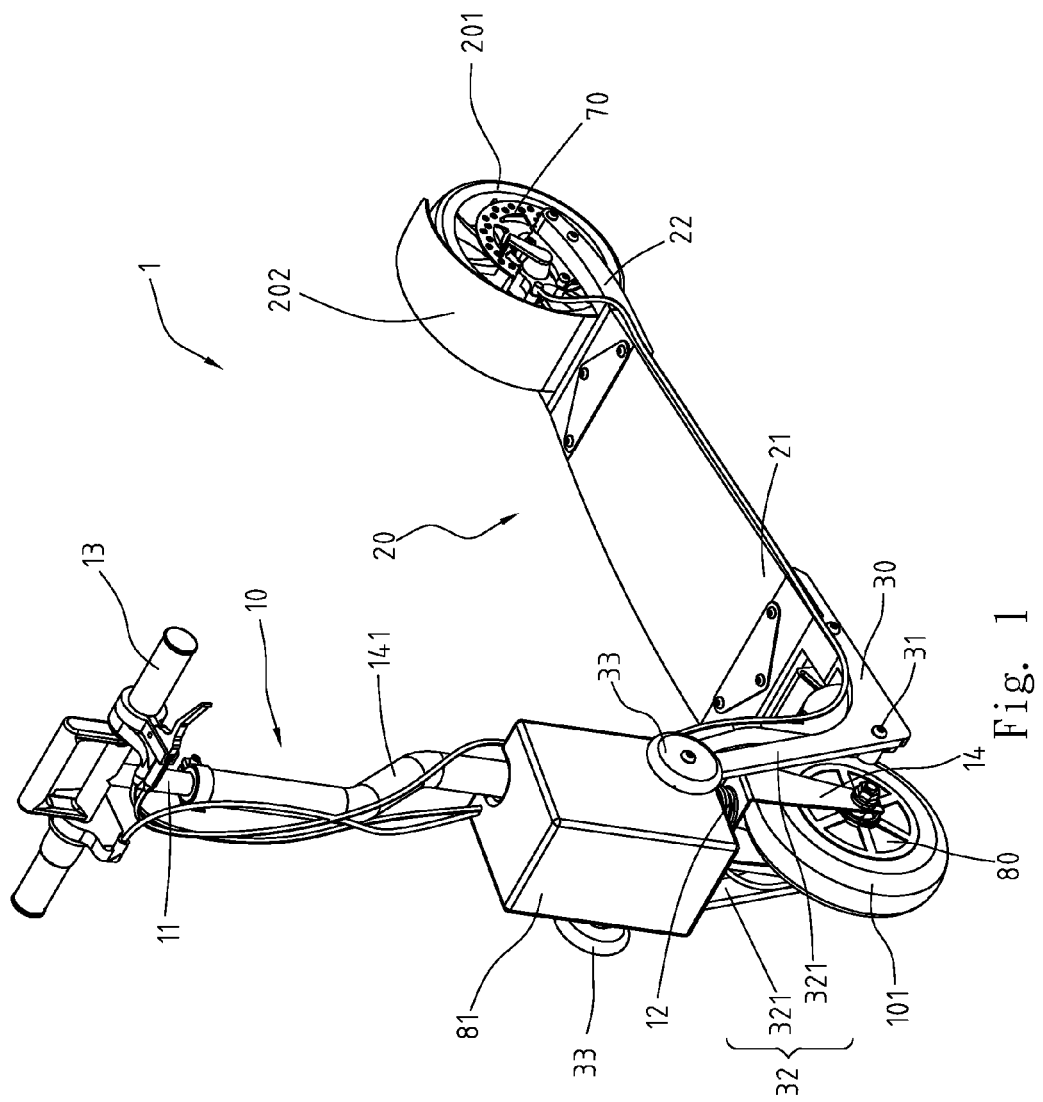
FIG. 1 is a 3-D schematic view showing a scooter structure according to the first embodiment of the instant disclosure.
Figure 2:
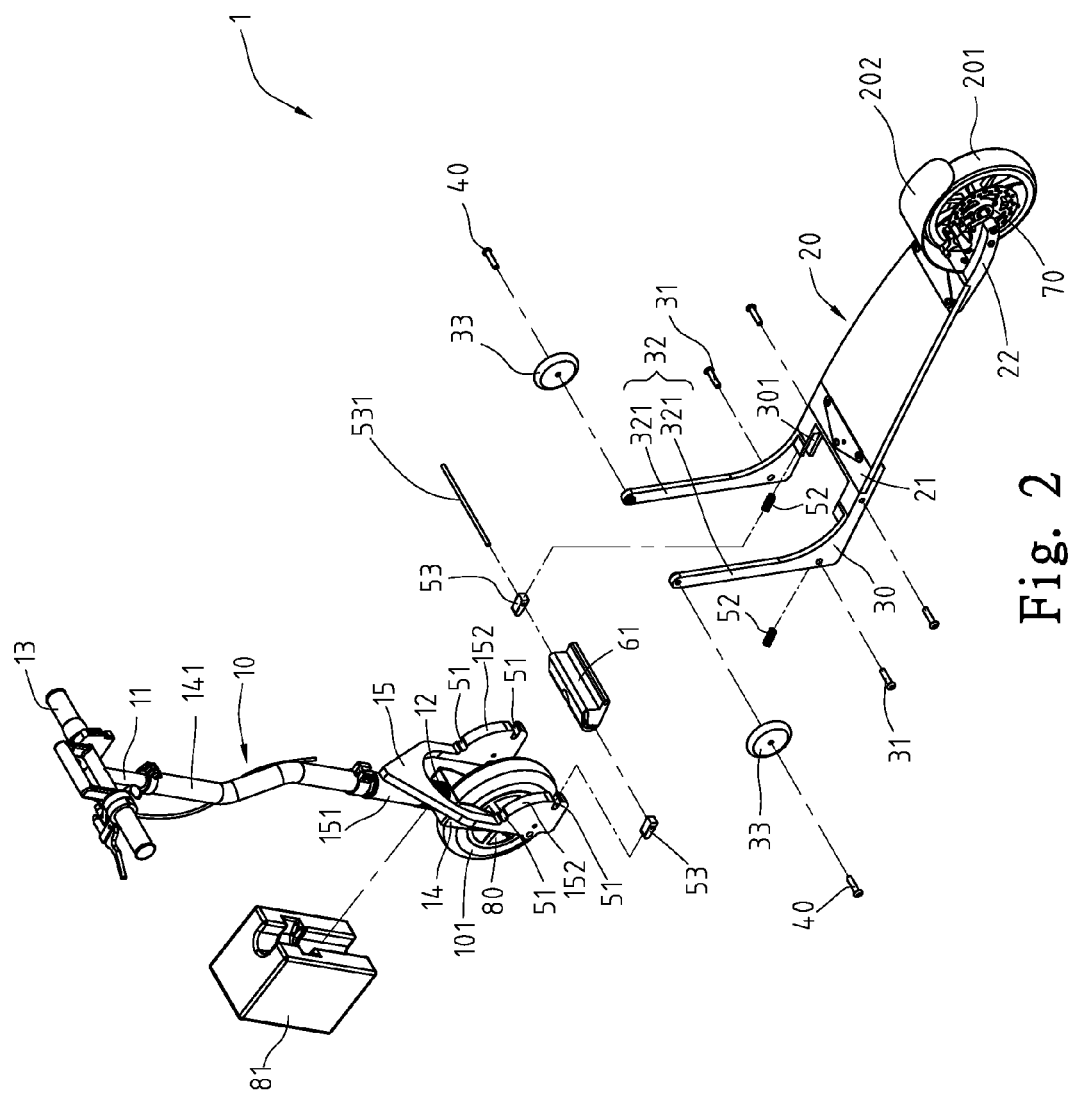
FIG. 2 is an exploring view showing the scooter structure according to the first embodiment of the instant disclosure.

As shown in FIG. 1 and FIG. 2, which respectively show a 3-D schematic view and n exploring view of a scooter structure according to the first embodiment of the instant disclosure. The scooter structure 1 comprises a vertical frame 10 and a pedal body 20.

The vertical frame 10 is a vertical standing frame body, which comprises a top end 11 and a bottom end 12. The top end 11 is located higher than the bottom end 12. The top end 11 of the vertical frame 10 is disposed with a turning handle 13. The bottom end 12 is disposed with a front fork bracket 14, and the front fork bracket 14 is pivoted with a rotatable front wheel 101.

In this embodiment, the front fork bracket 14 further comprises a standing rod 141 extending upwardly. The front fork bracket 14 is further connected to a connecting rack 15. The connecting rack 15 is a reversed U-shaped rack, which comprises a head tube 151. The head tube 151 of the connecting rack 15 covers the standing rod 141 of the front fork bracket 14, and the user may control the turning handle 13 so as to rotate the front fork bracket 14 and the front wheel 101 with respect to the connecting rack 15. For example, when the user controls the scooter structure 1 for turning, the user may turn the turning handle 13 with an angle (such as 20, 30, or 40 degrees, which depends on the turning angle). The front fork bracket 14 and front wheel 101 may be rotated with the same angle as the turning handle 13 turning. Accordingly, the scooter structure 1 is more flexible and controllable when comparing to other moving structure (such as the skateboard) that cannot or hard to change direction. In another embodiment, the front fork bracket 14 may be fixed (such as by soldering), to the connecting rack 15, which are used to limit the present invention.

Figure 8:
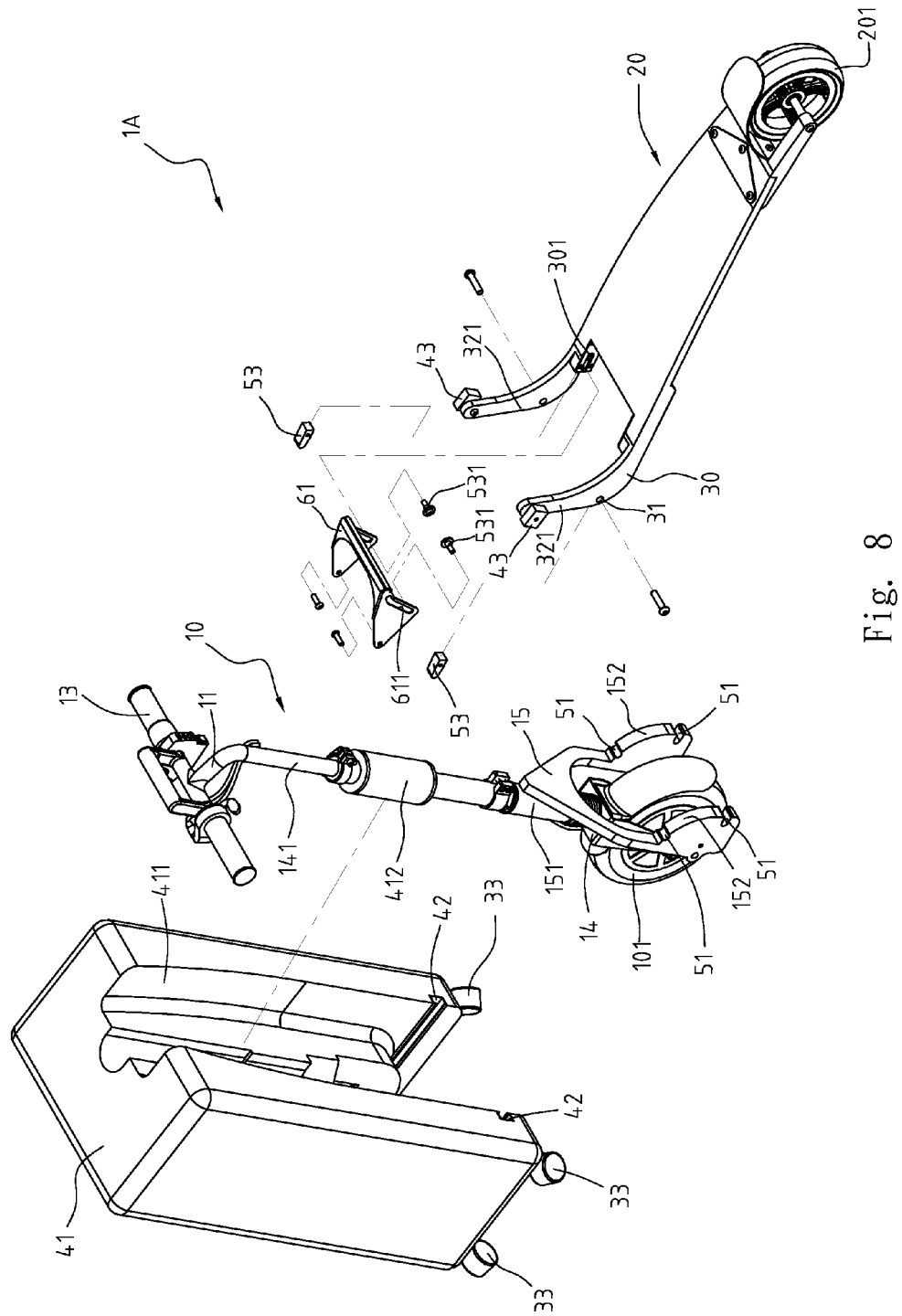
FIG. 8 is an exploring view showing the scooter structure according to the second embodiment of the instant disclosure.

The pedal body 20 is a flat board for the user to stand thereon. The pedal body 20 comprises a front end 21 connected to the auxiliary supporter 30 and a rear end 22 pivoted to the rear wheel 201. In this embodiment, the front end 21 of the pedal body 20 uses screw(s) to connect with the auxiliary supporter 30. Alternatively, the pedal body 20 and the auxiliary supporter 30 may be formed in one piece, as shown in FIG. 8, for example, which may be formed by forging molding, extrusion molding, casting molding, or carbon fiber molding.

The auxiliary supporter 30 comprises a pivoting portion 31 and an extension element 32. The pivoting portion 31 pivoted to the bottom end 12 of the vertical frame 10. The extension element 32 is located higher than the pivoting portion 31. The extension element 32 uses an assembling component 40 to assemble at least one auxiliary wheel 33. In this embodiment, the pedal body 20 and the extension element 32 are formed substantially in L-shaped. The pivoting portion 31 is a rotary shaft disposed through the connecting rack 15, so as to allow the pedal body 20 rotating toward to the vertical frame 10. The extension element 32 comprises two extending arms 321 disposed at two sides of the vertical frame 10 respectively. The two extending arms 321 are extending upwardly (toward to the extension direction of the top end 11 of the vertical frame 10), and the two extending arms 321 are higher than the pivoting portion 31. The assembling component 40 comprises pivot shafts (or pins) passing though the auxiliary wheels 33 respectively and pivoting to the end of the two extending arms 321 respectively. In some other embodiments, the extension element 32 is not limited to having the extending arms 321, which may be formed as multi linkage mechanics or a curved rack.

The scooter structure 1 may further comprise a brake 70 and a driving motor 80. The brake may be a caliper brake, drum brake, disc brake, band brake, cone brake, etc, which is disposed on one of the front wheel 101 or the rear wheel 201, so as to slow down or stop the scooter structure 1. Alternatively, a fender 202 may be used to slow down or stop the scooter structure 1; for example, the user may step on the fender 202 to generate friction between the fender 202 and the rear wheel 201 so as to slow down or stop the scooter structure 1.

The driving motor 80 is disposed on one of the front wheel 101 or the rear wheel 201. The driving motor 80 may connect to an electronic control device 81. The electronic control device 81 is used to start the driving motor 80 and to drive at least one of the front wheel 101 or the rear wheel 201 for rotation. The scooter structure 1 may be driven by electric power, which is favorable to long distance moving or hilly roads without man power. In addition, the user may kick (manually), to move the scooter structure 1 forward, which is not used to limit the present invention.

Figure 3:
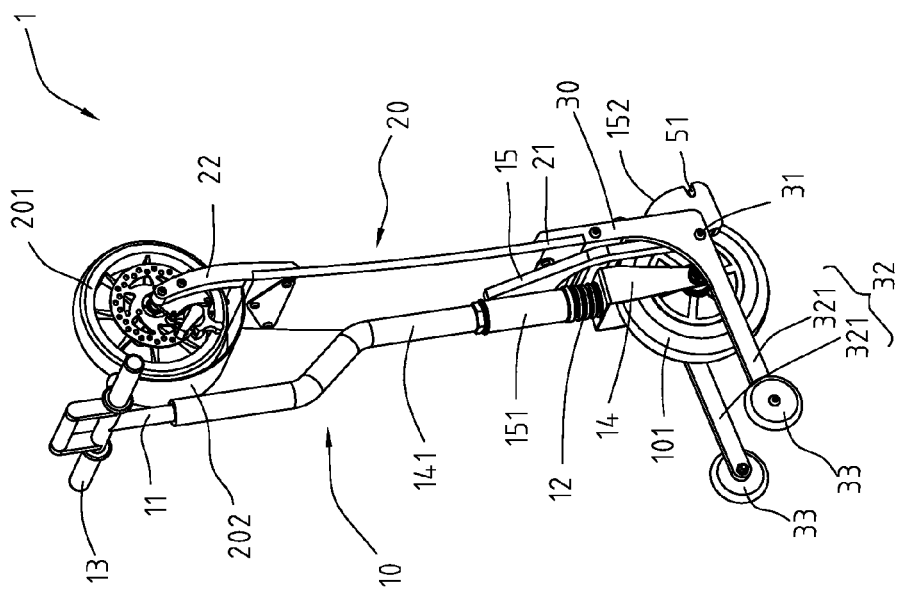
FIG. 3 is a 3-D schematic view showing the scooter is folded according to the first embodiment of the instant disclosure.

According to the above design, the pedal body 20 may selectively be rotated between the expansion position P1 and the folded position P2 with respect to the vertical frame 10 by using the pivoting portion 31 as the rotating shaft. The expansion position P1, as shown in FIG. 1 and FIG. 4A, refers to the position that the pedal body 20 is far away from the vertical frame 10 and the rear wheel 201 is on the ground. In this position, both the front wheel 101 and the rear wheel 201 are on the ground, and the user may stand on the pedal body 20 and control the turning handle 13 to change direction. Additionally, the front wheel 101 and the rear wheel 201 may be driven manually or electric power as described previously, so as to move the scooter structure 1 forward. In this position, the two extending arms 321 are extending upwardly, so the auxiliary wheels 33 are higher than the front wheel 101 and the rear wheel 201 without intervening. The folded position P2, as shown in FIG. 3 and FIG. 4A, refers to the position that the pedal body 20 is close to the vertical frame 10 and the auxiliary wheels 33 are on the ground. That is, when the pedal body 20 is rotated toward to the vertical frame 10, the extension element 32 is rotated toward to the same direction (toward to the ground, as shown in FIG. 3), at the same time. The auxiliary wheels 33, at the end of the extension element 32, fall down to the ground. In other words, the movement of the pedal body 20 and the extension element 32 is similar to the leverage principle; when the pedal body 20 is rotated upwardly, the extension element 32 is rotated downwardly. Accordingly, when the pedal body 20 and the vertical frame 10 are folded as standing position, the auxiliary wheels 33 and the front wheel 101 may be positioned as supporting. In this position, the auxiliary wheels 33 and the front wheel 101 are all on the ground and forming three contact (ground), points so as to support the scooter structure 1 for standing alone. Additionally, the auxiliary wheels 33 and the front wheel 101 may be used to move the scooter structure 1. For example, the user may drag the vertical frame 10 for rolling or sliding the auxiliary wheels 33 and the front wheel 101.

Figure 4B:
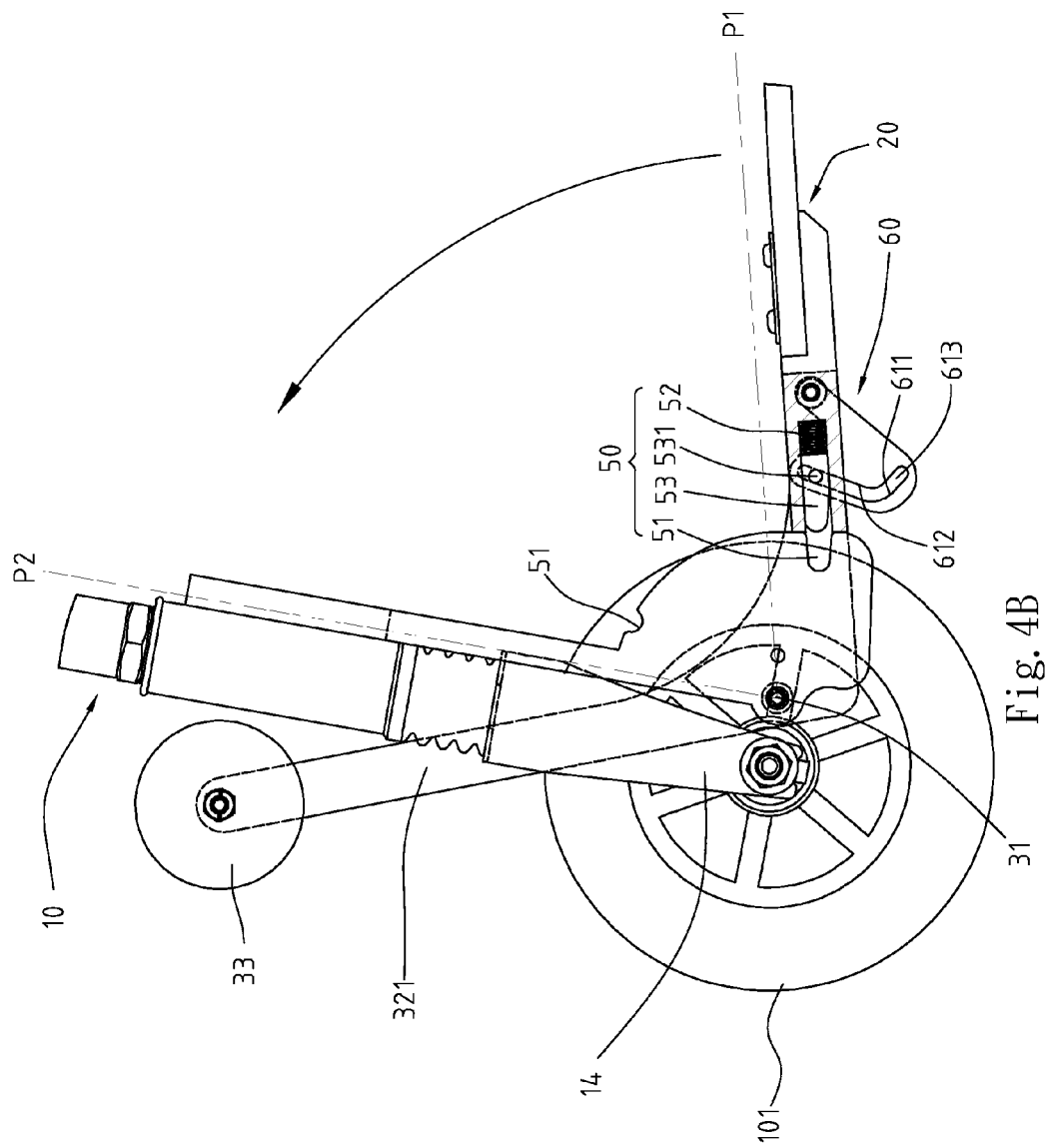
FIG. 4B a side view showing the folding movement (2) of the scooter according to the first embodiment of the instant disclosure.

Please refer to FIG. 2 and FIG. 4B. The scooter structure 1 comprises a fixing body 50 for fixing the pedal body 20 at the expansion position P1 or the folded position P2. In this embodiment, the connecting rack 15 of the vertical frame 10 comprises a curved guiding surface 152 at two sides of the front wheel 101 respectively. The fixing body 50 comprises two slots 51 disposed at two ends each curved guiding surface 152, two elastic members 52 (such as springs), and two locking member 53 (such as bolts), connecting with each elastic member 52. Two sides of the auxiliary supporter 30 are disposed with a limiting groove 301 respectively. Each elastic member 52 and each locking member 53 are located within each limiting groove 301 of the auxiliary supporter 30, and each locking member 53 may selectively lock onto or release from each slot 51.

For example, the slot 51 may be a curved indentation. When the pedal body 20 is in the expansion position P1, the locking member(s) 53 is locked onto the slot(s) 51 by the elastic force of the elastic member(s) 52. The pedal body 20 may be fixed in the expansion position P1, and it may increase the safety when in use. When the user folds the scooter structure 1, the pivoting portion 31 is the rotating shaft, and the pedal body 20 is pressed to rotate toward to the vertical frame 10. Each locking member 53 is oppressed by each connecting rack 15 and moved toward to each elastic member 52 so as to release from each slot 51. When the pedal body 20 is in the folded position P2, the locking member(s) 53 is locked onto another slot(s) 51 by the elastic force of the elastic member(s) 52. The pedal body 20 may be fixed in the folded position P2, and it may increase the safety when the scooter structure 1 is dragged or put for standing.

In some other embodiment, the fixing body 50 may comprise a slot 51, an elastic member 52, and a locking member 53 disposed on one side of the scooter structure 1 corresponding to the expansion position P1 for the pedal body 20. With respect to the folded position P2, the pedal body 20 may be fixed by other mechanics, for example, by using string to tide the pedal body 20 and the vertical frame 10. Alternatively, the pedal body 20 and the vertical frame 10 may be disposed with other locking member assembly. The mechanics is not limited to the above examples.

Figure 10:
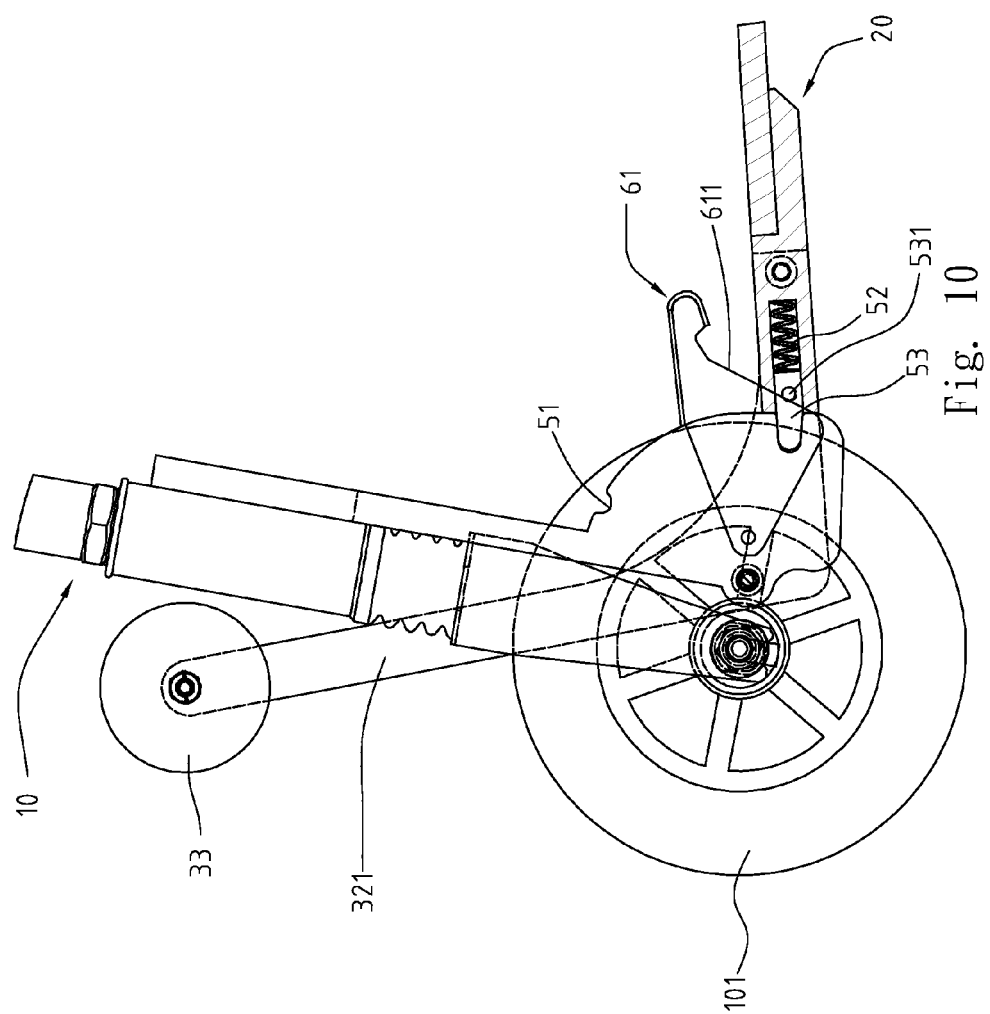
FIG. 10 is a side view showing the release body according to another embodiment of the instant disclosure.

As shown in FIG. 4A, the scooter structure 1 may comprise a release body 60 for releasing the fixing body 50 from the fixing position. In this embodiment, the release body 60 comprises a releasing member 61 and a following member 531 connected to the locking member 53. As shown in FIG. 2, the following member 531 is a connecting rod. Alternatively, as shown in FIG. 8, the following member 531 comprises two pivot shafts connecting to the locking members 53 respectively. The releasing member 61 is pivoted to the auxiliary supporter 30 rotatably. The releasing member 61 comprises a driving surface 611 abutting against on the following member 531. As shown in FIG. 4A, the driving surface 611 may be a curved surface. Alternatively, as shown in FIG. 10, the driving surface 611 may be an inclined plane. The releasing member 61 may further comprise a limiting wall 612. A guiding slot 613 is formed between the limiting wall 612 and the driving surface 611. The following member 531 is located within the guiding slot 613 and avoided to be release.

Figure 4C:
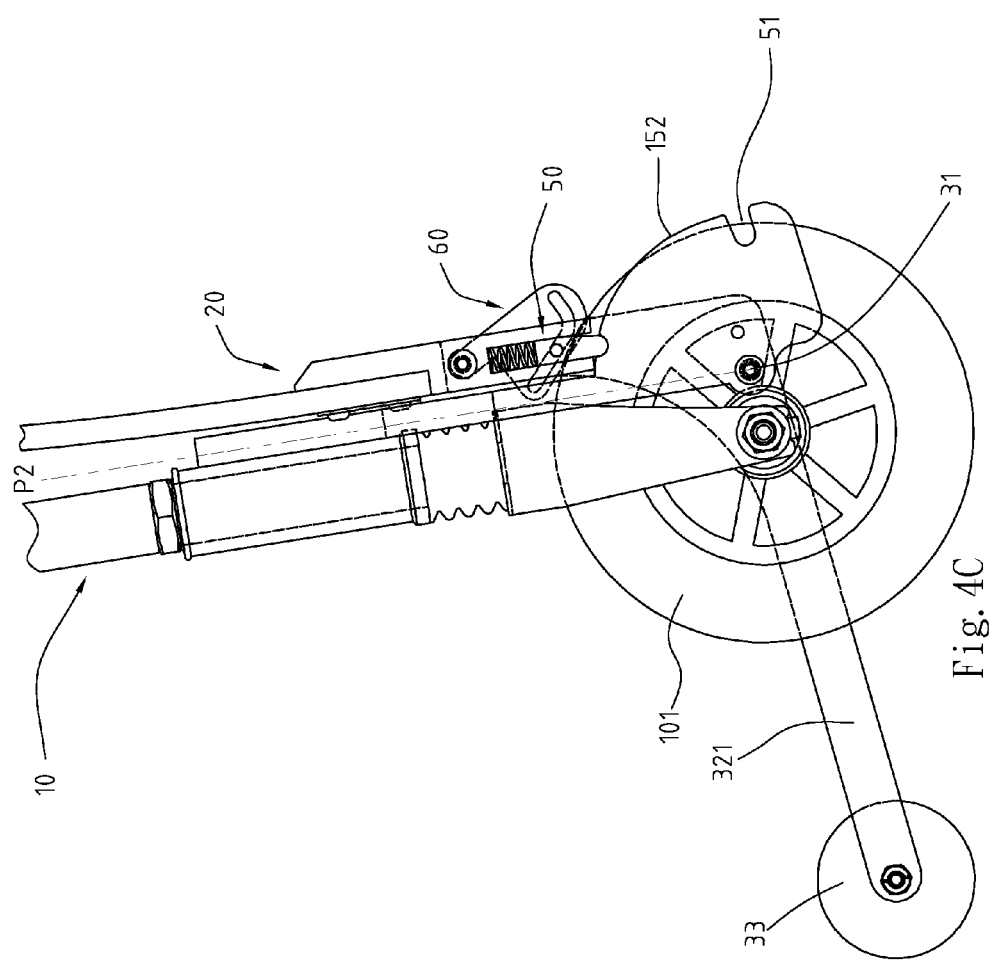
FIG. 4C a side view showing the folding movement (3) of the scooter according to the first embodiment of the instant disclosure.
Figure 5:
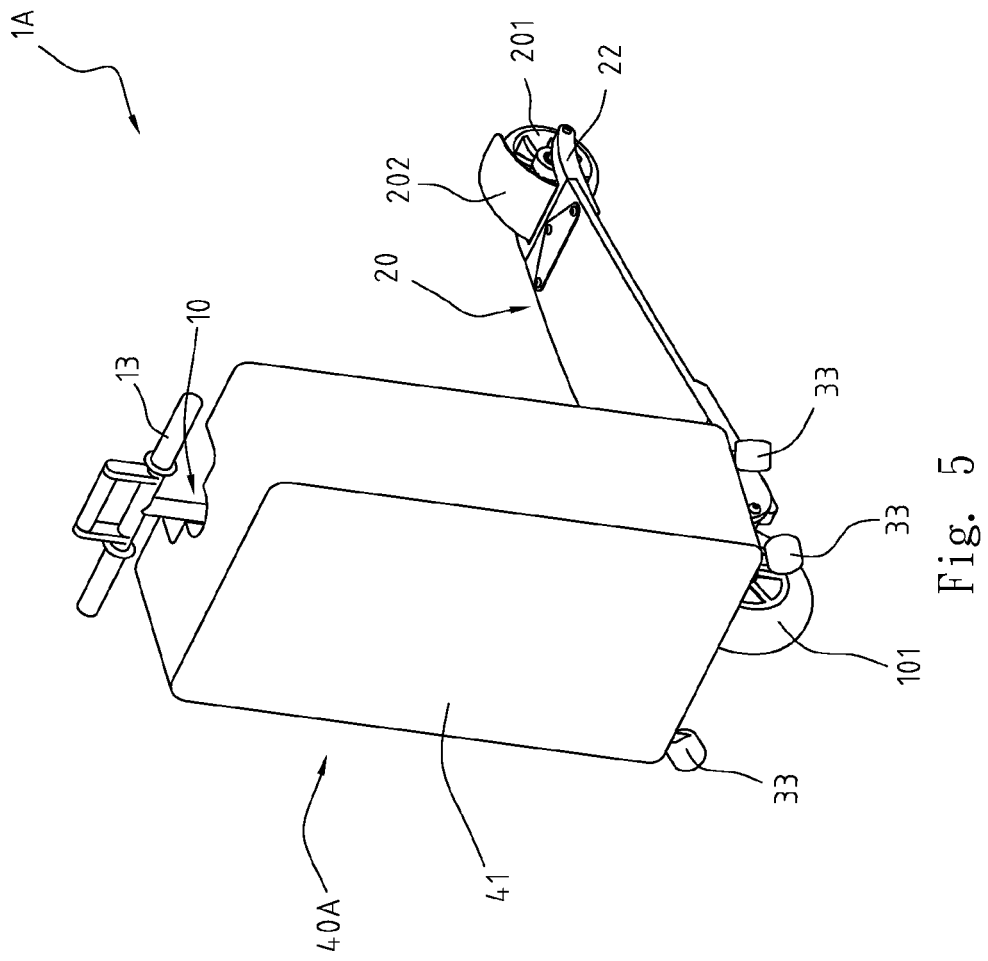
FIG. 5 is a 3-D schematic view (1) showing a scooter structure according to the second embodiment of the instant disclosure.
Figure 6:
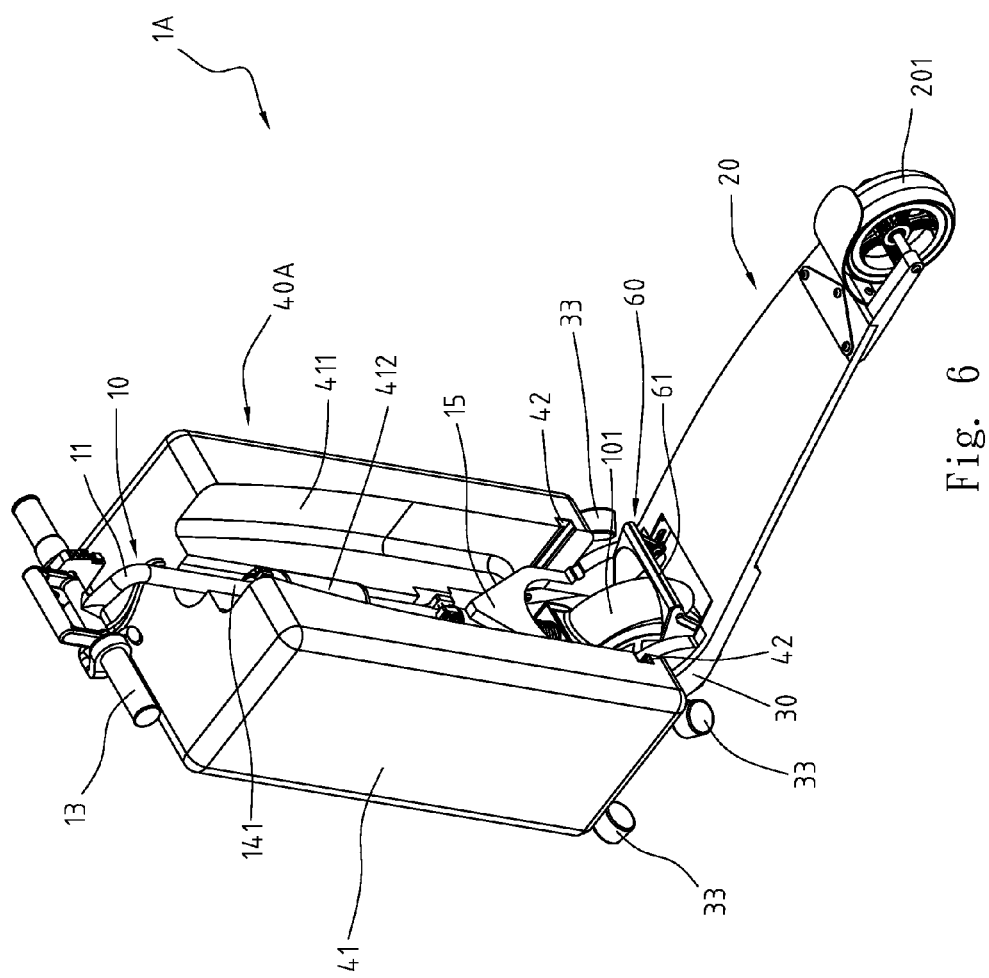
FIG. 6 is a 3-D schematic view (2) showing a scooter structure according to the second embodiment of the instant disclosure.

Accordingly, as shown in FIG. 4B, when the user folds the scooter structure 1, the user may step or press the releasing member 61 to rotate. The releasing member 61 uses the driving surface 611 to press the following member 531 that is connected to the locking member 53. Consequently, the following member 531 moves the locking member 53 toward to the elastic member 52 so as to release the locking member 53 from the slot 51. The pedal body 20 may be in the status of free rotation from the status of fixing, and the pedal body 20 may be rotated toward to the vertical frame 10 for the folded position P2, as shown in FIG. 3 and FIG. 4C.

As shown in FIG. 5 to FIG. 8, which show 3-D schematic views (1), (2), (3), and an exploring view respectively, of the scooter structure according to the second embodiment of the present invention. The difference(s) between the scooter structure 1A of the second embodiment and the scooter structure 1 of the above embodiment is an assembling component 40A comprising a receiving box 41, at least one sliding groove 42, and at least one sliding brick 43. The sliding groove 42 is disposed on the receiving box 41, and the sliding brick 43 is disposed and sliding within the sliding groove 42. The sliding brick 43 is pivoted to the extension element 32, and the auxiliary wheels 33 are assembled to the bottom of the receiving box 41.

Figure 7:
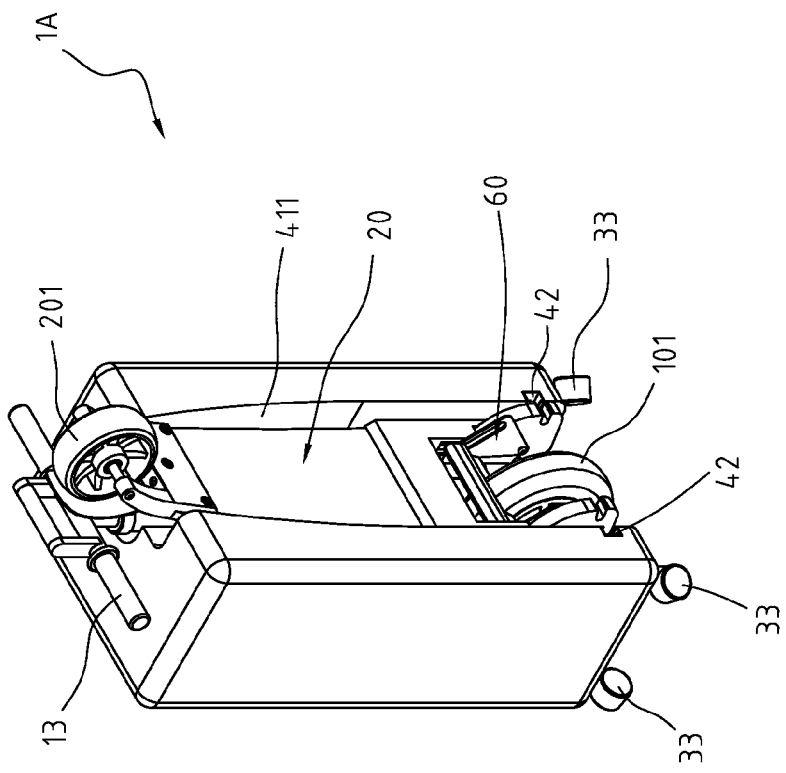
FIG. 7 is a 3-D schematic view (3) showing a scooter structure according to the second embodiment of the instant disclosure.
Figure 9A:
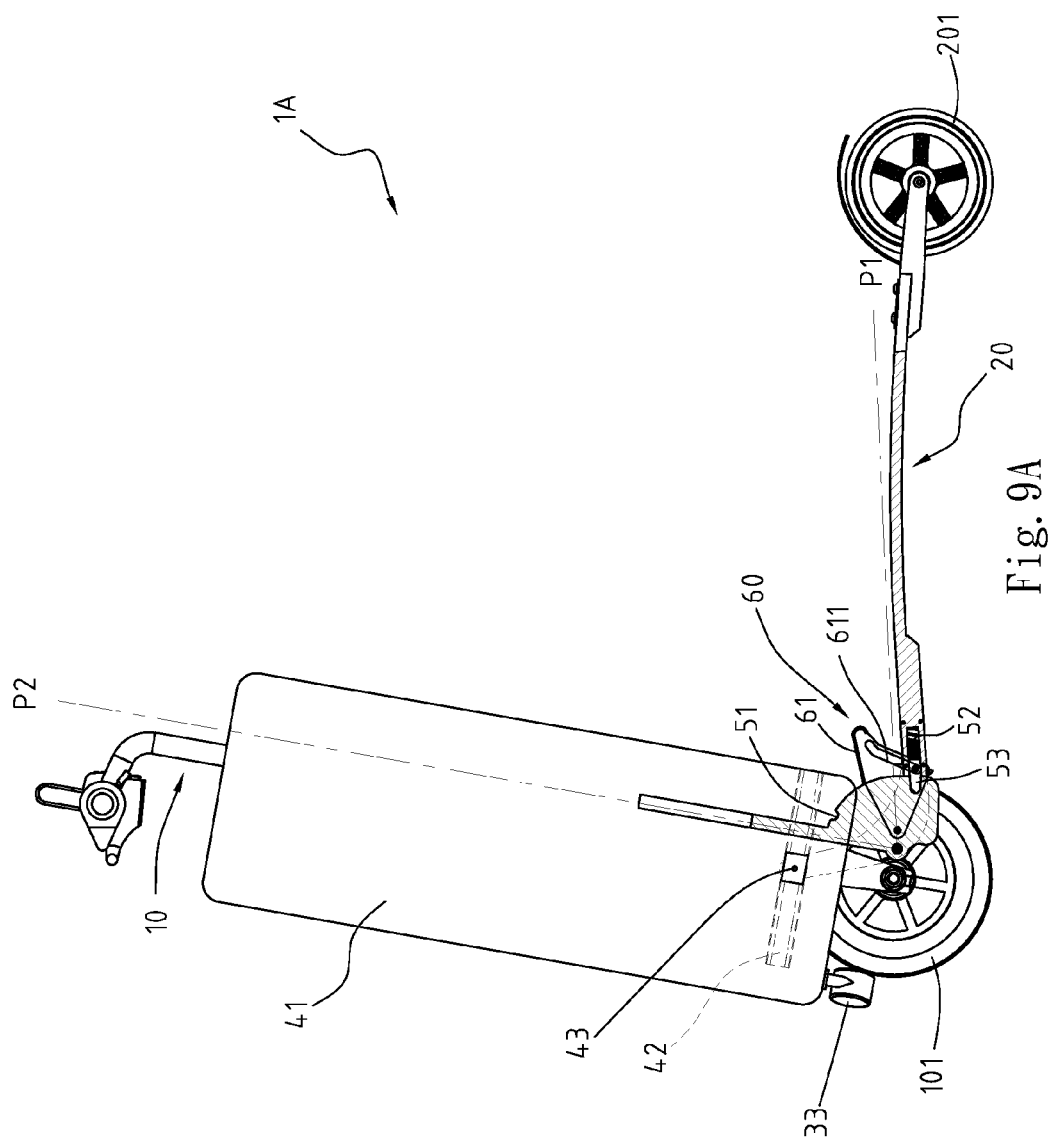
FIG. 9A is a side view showing the folding movement (1) of the scooter according to the second embodiment of the instant disclosure.
Figure 9B:
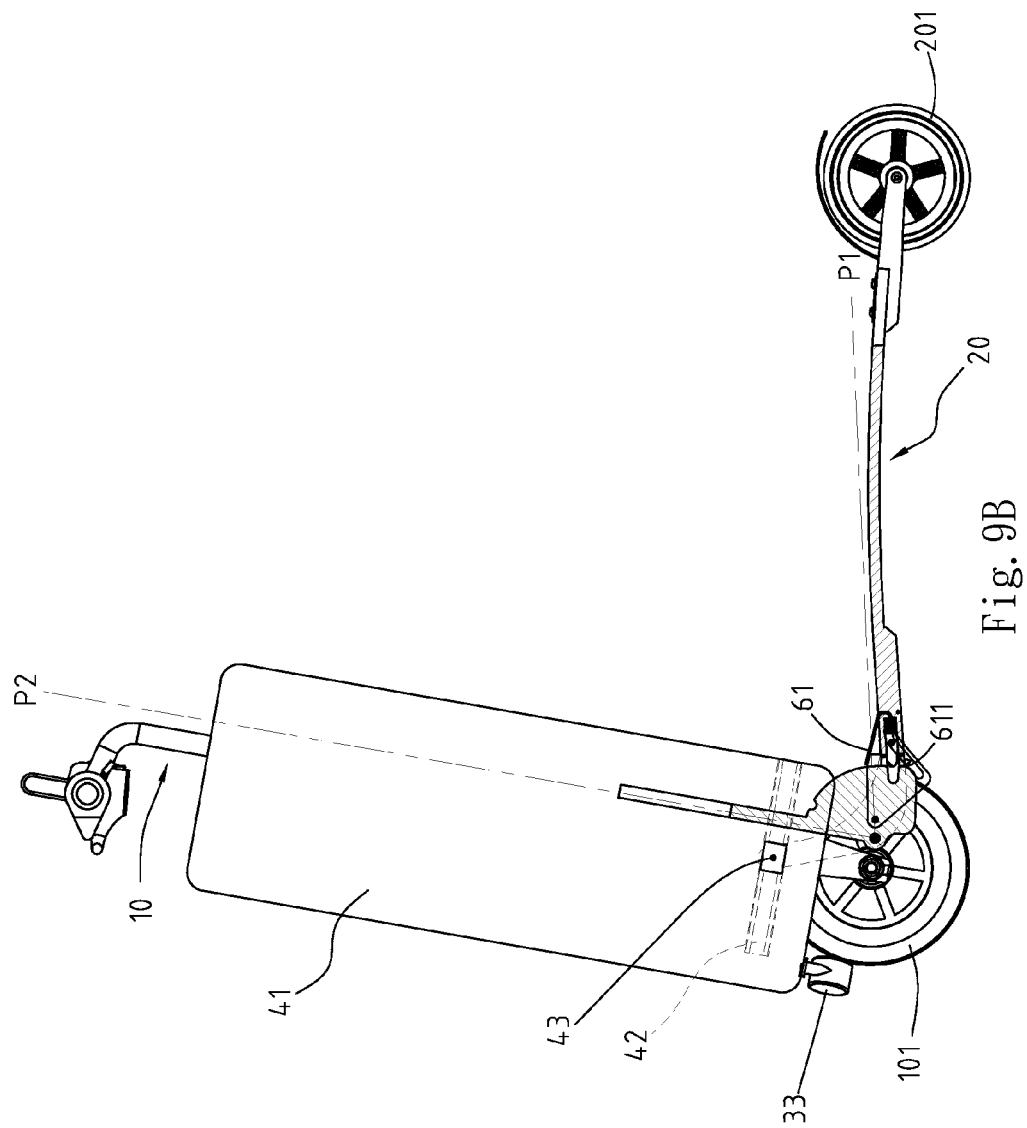
FIG. 9B is a side view showing the folding movement (2) of the scooter according to the second embodiment of the instant disclosure.

In this embodiment, the receiving box 41 is concaved with a receiving portion 411 at the side corresponding to the vertical frame 10. The receiving portion 411 may receive and fix a sleeve 412. The sleeve 412 is disposed outside of the vertical frame 10 for limiting the vertical frame 10 within the receiving portion 411 and moving the vertical frame 10 up and down. Two inner sides of the receiving portion 411 are further concaved with the sliding groove(s) 42. The extension element 32 comprises two extending arms 321. The sliding brick 43 is pivoted on the end of each extending arm 321. The sliding brick(s) 43 may be slid and moved within the sliding groove 42. The bottom of the receiving box 41 disposes with multiple auxiliary wheels 33, such as four wheels at four bottom corners of the receiving box 41, as shown in FIG. 7. That is, the receiving box 41 may be a luggage carrier, and the auxiliary wheels 33 may be the wheels of the luggage carrier. Accordingly, as shown in FIG. 9A, when the pedal body 20 is located in the expansion position P1, the extension element 32 is higher than the pivoting portion 31. The receiving box 41 may be moved upward by the extension element 32 lifting, and the auxiliary wheels 33 of the receiving box 41 may be away from the ground and located higher than the front wheel 101 and the rear wheel 201. As shown in FIG. 9B, when the user folds the scooter structure 1A, same as the first embodiment, the user may step or press the releasing member 61 to rotate. The releasing member 61 uses the driving surface 611 to press the following member 531 that is connected to the locking member 53. Consequently, the following member 531 moves the locking member 53 toward to the elastic member 52 so as to release the locking member 53 from the slot 51. The pedal body 20 may be in the status of free rotation from the status of fixing, and the pedal body 20 may be rotated toward to the vertical frame 10 for the folded position P2, as shown in FIG. 7 and FIG. 9C.

As shown in FIG. 9C, during the pedal body 20 is rotated toward to the vertical frame 10 for the folded position P2, the sliding brick(s) 43 at the end of the extension element 32 may be slid and moved away from the pedal body 20 along the sliding groove(s) 42, and the vertical frame 10 moves upwardly and the receiving box 41 moves downwardly. When the pedal body 20 is located in the folded position P2, the auxiliary wheels 33 of the receiving box 41 are on the ground. Consequently, the user may move the scooter structure 1A easily by using the auxiliary wheels 33 of the receiving box 41. In some other embodiment, the front wheel 101 may be also on the ground when the auxiliary wheels 33 are on the ground, which are not used to limit the present invention.

In summary, the pedal body may use the pivoting portion as the rotary shaft, and rotate toward to the vertical frame for the standing position, and the auxiliary wheels assembled to the auxiliary supporter may be on the ground. The auxiliary wheels and the front wheel may be on the ground at the same time for supporting the scooter structure. Alternatively, the front wheel may be not on the ground with only the auxiliary wheels on the ground for the supporting. After folding, the pedal body and the vertical frame are in the standing position and supported by the wheels, thus reducing the required storage space.

In addition, after folding the pedal body and the vertical frame, the scooter structure may be moved by the auxiliary wheels and the front wheel or by only the auxiliary wheels. Accordingly, the user may drag the scooter structure easily by standing the pedal body and the vertical frame, which may avoid the scooter structure affecting other people who are walking, or collision with other objects. Additionally, the scooter structure does not need to be carried by hand or by using a bag, which may reduce the user's load when carrying the scooter.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A scooter structure comprising:
a vertical frame comprising a top end and a bottom end, wherein the top end is higher than the bottom end, and the bottom end is disposed with a front wheel; and
a pedal body comprising a front end and a rear end, wherein the rear end is disposed with a rear wheel, the front end is connected to an auxiliary supporter, the auxiliary supporter comprises a pivoting portion pivoted to the bottom end of the vertical frame and an extension element higher than the pivoting portion, and the extension element is assembled with at least one auxiliary wheel by using an assembling component;
wherein the pedal body uses the pivoting portion as the rotary shaft and is selectively rotated between a expansion position and a folded position with respect to the vertical frame, the expansion position refers to the position that the pedal body is away from the vertical frame and the rear wheel is on the ground, and the folded position refers to the position that the pedal body is close to the vertical frame and the at least one auxiliary wheel is on the ground.

2. The scooter structure according to claim 1, wherein the top end of the vertical frame further comprises a turning handle, the bottom end comprises a front fork bracket disposed with a connecting rack and pivoted with the front wheel, and the pivoting portion of the auxiliary supporter is pivoted to the connecting rack.

3. The scooter structure according to claim 1, further comprising a fixing body for fixing the pedal body in the expansion position or in the folded position.

4. The scooter structure according to claim 3, wherein the fixing body comprises at least one slot, an elastic member, and a locking member connected to the elastic member, wherein the at least one slot is disposed on the vertical frame, and the elastic member and the locking member are disposed on the auxiliary supporter, and wherein the locking member may be selectively locking on or releasing from the at least one slot.

5. The scooter structure according to claim 4, further comprising a release body for releasing the fixing body from the fixing status.

6. The scooter structure according to claim 5, wherein the release body comprises a releasing member and a following member connected to the locking member, the releasing member is pivoted to the auxiliary supporter or the vertical frame rotatably, and the releasing member comprises a driving surface abutting against on the following member.

7. The scooter structure according to claim 1, further comprising a brake connected to the front wheel or the rear wheel, or the combination thereof.

8. The scooter structure according to claim 1, further comprising a driving motor for driving the front wheel or the rear wheel, or the combination thereof.

9. The scooter structure according to claim 1, wherein the assembling component comprises at least one pivot shaft disposed through the at least one auxiliary wheel.

10. The scooter structure according to claim 1, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

11. The scooter structure according to claim 2, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

12. The scooter structure according to claim 3, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

13. The scooter structure according to claim 4, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

14. The scooter structure according to claim 5, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

15. The scooter structure according to claim 6, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

16. The scooter structure according to claim 7, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

17. The scooter structure according to claim 8, wherein the assembling component comprises a receiving box, at least one sliding groove, and at least one sliding brick, the at least one sliding groove is disposed on the receiving box, the least one sliding brick is slid and moved within the at least one sliding groove, the at least one sliding brick is pivoted to the extension element, and the bottom of the receiving box is assembled with the at least one auxiliary wheel.

* * * * *